United States Patent
Sato et al.

(10) Patent No.: US 8,551,412 B2
(45) Date of Patent: *Oct. 8, 2013

(54) HONEYCOMB STRUCTURE (75) Inventors: Hiroki Sato, Ibi-Gun (JP); Masafumi Kunieda, Ibi-Gun (JP); Ikuhito Teshima, Ibi-Gun (JP); Yuki Fujita, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 174 days.

This patent is subject to a terminal disclaimer.

(21) Appl. No.: 12/892,929

(22) Filed: Sep. 29, 2010

(65) Prior Publication Data

US 2011/0118106 A1 May 19, 2011

(30) Foreign Application Priority Data

Nov. 19, 2009 (WO) .................. PCT/JP2009/069660

(51) Int. Cl.
*B01D 50/00* (2006.01)

(52) U.S. Cl.
USPC ........................................... 422/180

(58) Field of Classification Search
USPC ............ 422/177, 180; 428/116; 55/520–523
See application file for complete search history.

(56) References Cited

U.S. PATENT DOCUMENTS

| | | | | |
|---|---|---|---|---|
| 4,867,954 A | * | 9/1989 | Staniulis et al. | 423/239.1 |
| 5,198,007 A | | 3/1993 | Moyer et al. | |
| 5,589,147 A | * | 12/1996 | Farnos et al. | 423/239.2 |
| 2003/0100446 A1 | * | 5/2003 | Hase et al. | 502/302 |
| 2003/0165638 A1 | * | 9/2003 | Louks et al. | 427/600 |
| 2004/0166035 A1 | | 8/2004 | Noda et al. | |
| 2006/0290036 A1 | | 12/2006 | Kaneda et al. | |
| 2006/0292044 A1 | * | 12/2006 | Ohno et al. | 422/168 |
| 2007/0259770 A1 | | 11/2007 | Hofmann et al. | |
| 2007/0269352 A1 | | 11/2007 | Miyairi et al. | |
| 2007/0289275 A1 | * | 12/2007 | Ohno et al. | 55/523 |
| 2008/0118682 A1 | * | 5/2008 | Ido et al. | 428/34.1 |
| 2008/0138568 A1 | * | 6/2008 | Tomita et al. | 428/116 |
| 2009/0041975 A1 | * | 2/2009 | Kodama et al. | 428/116 |
| 2009/0186188 A1 | * | 7/2009 | Shindo | 428/116 |

FOREIGN PATENT DOCUMENTS

| | | |
|---|---|---|
| EP | 0875272 | 11/1998 |
| EP | 1717218 | 11/2006 |
| JP | 56095342 A * | 8/1981 |
| JP | 2003-033664 | 2/2003 |
| JP | 2007-001836 | 1/2007 |
| JP | 2007-296514 | 11/2007 |
| JP | 2007-296521 | 11/2007 |
| WO | WO 2005/063653 | 7/2005 |
| WO | WO 2006/137149 | 12/2006 |

OTHER PUBLICATIONS

Extended European Search Report for corresponding EP Application No. 10175406.7-2104, Apr. 18, 2011.

* cited by examiner

*Primary Examiner* — Tom Duong
(74) *Attorney, Agent, or Firm* — Ditthavong Mori & Steiner, P.C.

(57) ABSTRACT

A honeycomb structure includes a honeycomb unit. The honeycomb unit includes plural cells, inorganic particles, and at least one of a flake substance, a tetrapod-shaped substance, and a three-dimensional needle-shaped substance. The plural cells extend from a first end face to a second end face of the honeycomb structure along a longitudinal direction of the honeycomb structure. The plural cells are defined by cell walls.

26 Claims, 4 Drawing Sheets

HONEYCOMB STRUCTURE

CROSS-REFERENCE TO RELATED APPLICATION

The present application claims priority under 35 U.S.C §119 to International Application No. PCT/JP2009/069660 filed on Nov. 19, 2009, the entire contents of which are incorporated by reference herein.

BACKGROUND OF THE INVENTION

1. Field of the Invention

The present invention relates to a honeycomb structure.

2. Discussion of Background

Conventionally, as a honeycomb structure generally used for converting exhaust gas from an automobile, there is proposed one comprising porous honeycomb units which have plural through-holes and contain at least inorganic particles and inorganic fibers and in which the cross-sectional area of a surface orthogonal to the through-holes is in the range of 5 through 50 $cm^2$; and a sealing material layer which bonds two or more of the porous honeycomb units together at their external surfaces where the through-holes are not open (e.g., WO2005/063653A1).

The contents of International Publication No. WO2005/063653 are incorporated by reference herein.

SUMMARY OF THE INVENTION

According to an aspect of the present invention, a honeycomb structure includes a honeycomb unit. The honeycomb unit includes plural cells, inorganic particles, and at least one of a flake substance, a tetrapod-shaped substance, and a three-dimensional needle-shaped substance. The plural cells extend from a first end face to a second end face of the honeycomb structure along a longitudinal direction of the honeycomb structure. The plural cells are defined by cell walls.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE EMBODIMENTS

The conventional honeycomb structure described in WO2005/063653A1 is manufactured in such a manner that a raw material paste is extrusion-molded and then a molded body is fired. That is, in manufacturing the honeycomb structure, the raw material paste containing inorganic particles, inorganic fibers, and a binder is first extrusion-molded, and then the obtained molded body is fired. Note that the inorganic fibers are added to the raw material paste for the purpose of enhancing the strength of the resulting honeycomb structure.

The inorganic fibers are oriented along a direction substantially parallel to an extrusion-molding direction in the molded body obtained by molding the raw material paste. Therefore, in the resulting honeycomb structure, the inorganic fibers also extend along the longitudinal direction of the honeycomb structure. Due to the distribution of the inorganic fibers, the strength of the honeycomb structure depends on the direction of stress. In other words, the honeycomb structure exhibits its excellent strength against stress in the direction substantially parallel to the longitudinal direction due to the presence of the inorganic fibers. On the other hand, the honeycomb structure is likely to exhibit its relatively low strength against stress in the direction perpendicular to the longitudinal direction in spite of the presence of the inorganic fibers.

According to an embodiment of the present invention, it is possible to provide a honeycomb structure having relatively excellent strength even in a direction substantially perpendicular to the longitudinal direction of the honeycomb structure compared with a conventional honeycomb structure.

Hereinafter, the characteristics of the embodiment of the present invention are described with reference to the accompanying drawings.

Figure 1:
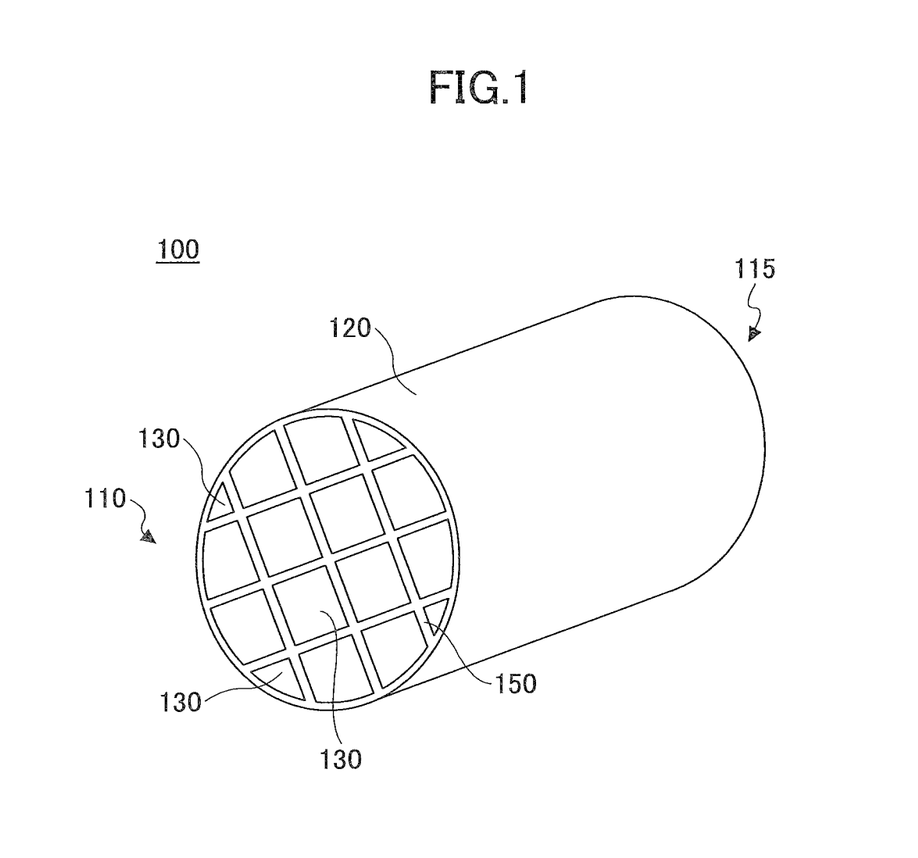
FIG. 1 is a perspective view schematically showing an example of a honeycomb structure according to an embodiment of the present invention.

FIG. 1 schematically shows a honeycomb structure according to the embodiment of the present invention. Further, FIG. 2 schematically shows an example of a honeycomb unit as a basic unit of the honeycomb structure shown in FIG. 1.

As shown in FIG. 1, the honeycomb structure 100 according to the embodiment of the present invention has two end faces 110 and 115. Further, the honeycomb structure 100 has generally a coating layer 120 at its peripheral surface other than the both end faces.

Figure 2:
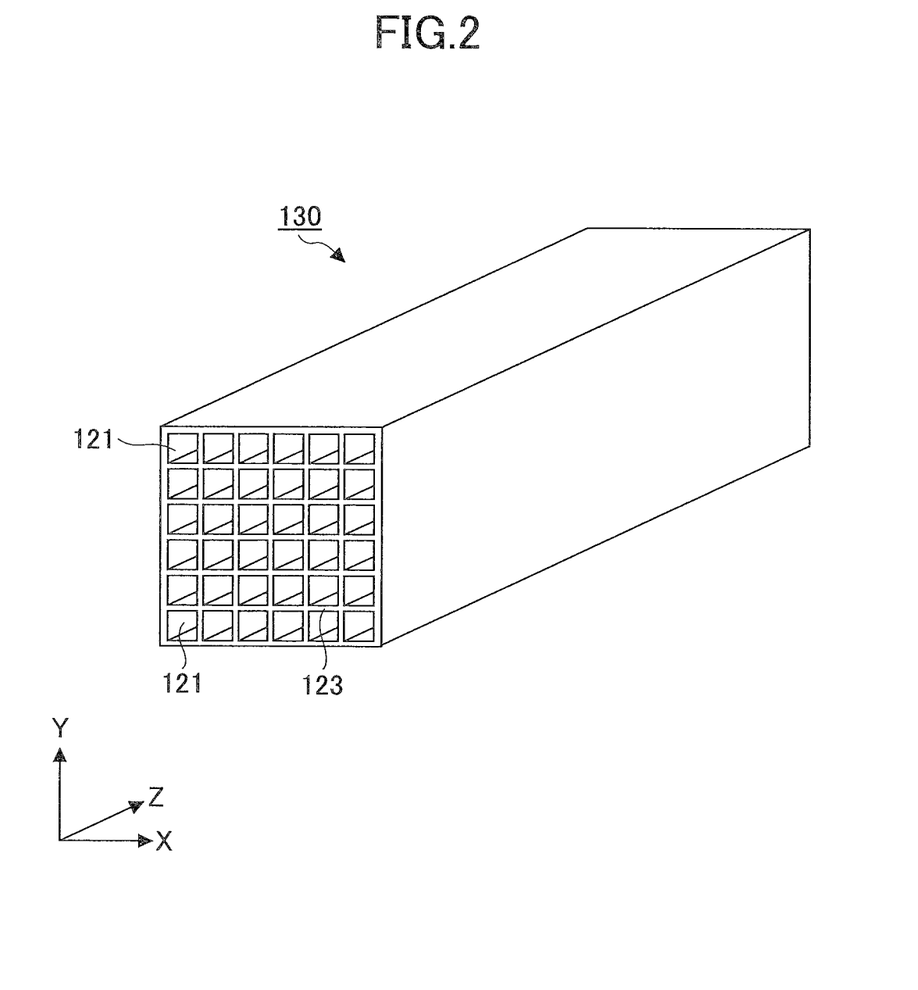
FIG. 2 is a perspective view schematically showing an example of a honeycomb unit constituting the honeycomb structure shown in FIG. 1.

For example, the honeycomb structure 100 is configured in such a manner that plural pillar-like ceramic honeycomb units 130 shown in FIG. 2 (16 honeycomb units arranged in four rows in vertical and horizontal directions in the example shown in FIG. 1) are bonded together through adhesive layers 150 and then the peripheries of the honeycomb units are cut into a prescribed shape (substantially cylinder in the example shown in FIG. 1).

As shown in FIG. 2, the honeycomb unit 130 has plural cells (through-holes) 121 that extend from one end to the other end along the longitudinal direction of the honeycomb unit 130 and are open at the both end faces of the honeycomb unit 130 and has cell walls 123 that partition the cells 121. In the example shown in FIG. 2, cross sections perpendicular to the longitudinal direction (Z-direction) of the cells 121 are not limited to, but are substantially squares.

When alumina, silica, titania, ceria, zirconia, mullite, or zeolite is used as inorganic particles contained in the honeycomb units, the honeycomb structure 100 having the honeycomb units can be used as a catalyst carrier for converting CO, HC, and/or NOx. Particularly, a honeycomb structure having a honeycomb unit using zeolite as inorganic particles can be used in the catalyst carrier of an SCR system.

The honeycomb structure 100 having the honeycomb units configured to contain zeolite is used as, e.g., the catalyst carrier of a urea SCR system having a urea tank.

When exhaust gas circulates in the urea SCR system having the honeycomb structure 100 having the honeycomb units configured to contain zeolite as a catalyst carrier, urea accommodated in the urea tank reacts with water in the exhaust gas to generate ammonia (Formula 1).

$$CO(NH_2)_2 + H_2O \rightarrow 2NH_3 + CO_2 \quad \text{(Formula 1)}$$

When the ammonia flows in the cells from one end face (e.g., the end face 110) of the honeycomb structure 100 together with exhaust gas containing NOx, the reactions as represented by the following formulae (2-1) and (2-2) occur due to the function of a catalyst such as zeolite contained in the cell walls.

$$4NH_3 + 4NO + O_2 \rightarrow 4N_2 + 6H_2O \quad \text{(Formula 2-1)}$$

$$8NH_3 + 6NO_2 \rightarrow 7N_2 + 12H_2O \quad \text{(Formula 2-2)}$$

Then, the converted exhaust gas is exhausted from the other end face (e.g., the end face 115) of the honeycomb structure 100. Thus, the NOx in the exhaust gas can be processed by the circulation of the exhaust gas in the honeycomb structure 100.

Inorganic fibers contained in the honeycomb units constituting the honeycomb structure 100 are oriented along a direction substantially parallel to an extrusion direction in a molded body obtained by extrusion-molding a raw material paste. Therefore, the inorganic fibers are also oriented along the longitudinal direction of the resulting honeycomb structure.

In the distribution of the inorganic fibers, however, the strength of the honeycomb structure depends on the direction of stress. In other words, the honeycomb structure exhibits its excellent strength against stress in a direction parallel to the longitudinal direction due to the presence of the inorganic fibers. On the other hand, the honeycomb structure is likely to exhibit its relatively low strength against stress in a direction perpendicular to the longitudinal direction in spite of the presence of the inorganic fibers.

Further, when such a honeycomb structure is used as a catalyst carrier, the honeycomb structure is attached to a metal casing. In this state, however, large compression stress is applied to the honeycomb structure in the direction in which the relatively low strength against stress is exhibited, i.e., in the direction perpendicular to the longitudinal direction. Accordingly, the honeycomb structure is easily cracked or damaged during or after its attachment to the metal casing.

Conversely, the honeycomb structure 100 according to the embodiment of the present invention includes at least one of squamation substances, i.e., "flake substances," "tetrapod-shaped substances," and "three-dimensional needle-shaped substances."

FIGS. 3A through 3D show an example of flake substances, tetrapod-shaped substances, and three-dimensional needle-shaped substances according to the embodiment of the present invention.

Here, it is to be noted that the "flake substances," "tetrapod-shaped substances," and "three-dimensional needle-shaped substances" are additives different from typical "inorganic fibers." The "flake substances" preferably have a thickness in the range of about 0.2 through about 5 μm (1c in FIG. 3A), a maximum length in the range of about 10 through about 160 μm (1a in FIG. 3A), and an aspect ratio (maximum length/thickness) in the range of about 3 through about 250.

Figure 3A:
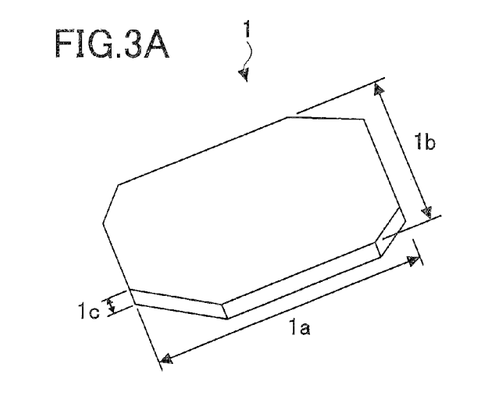
FIGS. 3A through 3D are schematic views showing examples of flake substances, tetrapod-shaped substances, and three-dimensional needle-shaped substances according to the embodiment of the present invention.
Figure 3B:
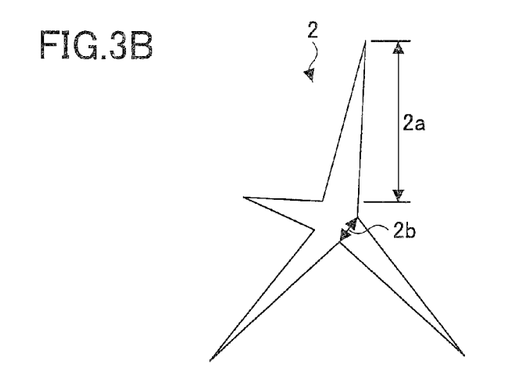

Further, the "tetrapod-shaped substances" preferably have an average needle-shaped length of their needle-shaped portions in the range of about 5 through about 30 μm (2a in FIG. 3B) and an average diameter of the needle-shaped portions in the range of about 0.5 through about 5 μm (2b in FIG. 3B).

Figure 3C:
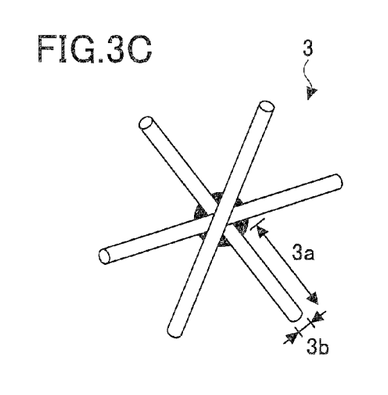

Moreover, when the "three-dimensional needle-shaped substances" are structured such that fibers are bonded together by an inorganic substance such as glass in the vicinity of the centers of the fibers as shown in FIG. 3C, an average fiber length of fiber portions (arranged ahead of bonding portions of the fibers) is preferably in the range of about 5 through about 30 μm (3a in FIG. 3C), and an average fiber thickness of the fiber portions is preferably in the range of about 1 through about 10 μm (3b in FIG. 3C).

Figure 3D:
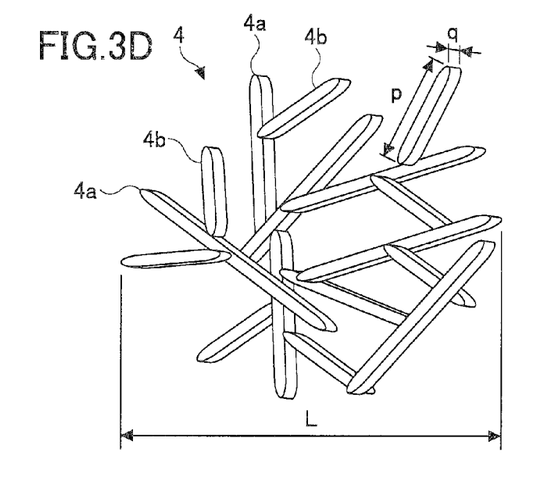

Further, when the "three-dimensional needle-shaped substances" are formed to have needle-shaped portions in the vicinity of the bonding parts of multidirectional needle-shaped portions as shown in FIG. 3D, an average particle diameter of a unit particle is preferably in the range of about 0.5 through about 50 μm (L in FIG. 3D), the thickness (average diameter) of the needle-shaped portions is preferably in the range of about 0.1 through about 5.0 μm (q in FIG. 3D), the length of the needle-shaped portions is preferably in the range of about 0.3 through about 30 μm (p in FIG. 3D), and an aspect ratio (length of the needle-shaped portions/thickness of the needle-shaped portions) is preferably in the range of about 1.4 through about 50.

Note that the thickness and the maximum length of the flake substances, or the average needle-shaped length of the tetrapod-shaped substances and the average diameter in the vicinity of the bonding parts of the needle-shaped portions are average values obtained from an SEM photograph of the flake substances or the tetrapod-shaped substances. Among them, the thickness of the flake substances is the average value calculated from 20 flake substances. Further, the maximum length of the flake substances is the average value calculated from 20 flake substances based on the maximum diameter of the flake substances approximated to (flat) particles.

Further, the average fiber length and the average fiber diameter of the three-dimensional needle-shaped substances is the average value calculated from 20 fibers of the three-dimensional needle-shaped substances.

Moreover, the average fiber length and the average fiber diameter of the fiber portions of the three-dimensional needle-shaped substances, or the particle diameter and the thickness and length of the needle-shaped portions of the three-dimensional needle-shaped substances in the other mode (i.e., in case the three-dimensional needle-shaped substances are configured to include the multi-directional needle-shaped portions) are the average values obtained from the SEM photograph of the three-dimensional needle-shaped substances. Among them, the thickness of the three-dimensional needle-shaped substances is the average value calculated from 20 needle-shaped portions of the three-dimensional needle-shaped substances. Further, the length of the needle-shaped portions is the value obtained by calculating distances between the most distal end parts and the first branch parts of the selected 20 three-dimensional needle-shaped substances and then averaging the distances thus calculated.

Note that the particle diameter of the three-dimensional needle-shaped substances can also be calculated by a laser diffraction type particle size distribution measurement apparatus. Since the bonding parts are small according to the length of the needle-shaped portions or the fiber portions, the particle diameter of the tetrapod-shaped substances and the particle diameter of the three-dimensional needle-shaped substances where the fibers are bonded together by an inorganic substance can be calculated regardless of the bonding parts.

FIGS. 3A and 3B show an example of the flake substances and that of the tetrapod-shaped substances, respectively.

Unlike typical inorganic fibers, such flake substances are less likely to be oriented in a specific direction in a honeycomb unit molded body obtained by extrusion-molding a raw material paste. In other words, the flake substances are oriented in the longitudinal direction of the honeycomb unit molded body. However, the flake substances 1 have a length of 1a, a width of 1b, and a thickness of 1c, and are thus likely to be dispersed with the width of the flake substances 1 randomly oriented perpendicular to the longitudinal direction. The tetrapod-shaped substances 2 are formed such that the needle-shaped portions 2a extend in a three-dimensional shape, and are thus dispersed with the needle-shaped portions of the tetrapod-shaped substances randomly oriented in the longitudinal direction of the honeycomb unit and the direction perpendicular to the longitudinal direction.

Further, as an example of the three-dimensional needle-shaped substances, FIG. 3C shows a fiber body 3 in which the plural fibers are bonded together at positions in the vicinity of their centers in the longitudinal direction of the respective fibers. Along with their three-dimensional shape, the plural fiber portions 3a are randomly oriented in the longitudinal direction of the honeycomb unit and the direction perpendicular to the longitudinal direction.

FIG. 3D shows other example of the three-dimensional needle-shaped substances. The three-dimensional needle-shaped substances 4 are configured such that the plural needle-shaped portions 4a of inorganic fibers are three-dimensionally connected to one another. Note that the respective needle-shaped portions 4a have plural finer needle-shaped portions 4b.

Also, in the three-dimensional needle-shaped substances described above, the needle-shaped portions 4a and 4b extend three-dimensionally. Therefore, when the three-dimensional needle-shaped substances are dispersed in the honeycomb unit, the needle-shaped portions 4a and 4b are randomly oriented in the longitudinal direction of the honeycomb unit and the direction perpendicular to the longitudinal direction.

As described above, the widths of the flake substances, the needle-shaped portions of the tetrapod-shaped substances, the fiber portions of the three-dimensional needle-shaped substances as one example, and the needle-shaped portions of the three-dimensional needle-shaped substances as another example are randomly oriented. Therefore, it is possible to enhance the strength of the honeycomb unit even in the direction substantially perpendicular to the longitudinal direction of the honeycomb structure.

Specifically, with the unregulated orientation of the widths of the flake substances in the direction perpendicular to the longitudinal direction of the honeycomb unit, or with the unregulated orientation of the needle-shaped portions or the fiber portions of the tetrapod-shaped substances and the three-dimensional needle-shaped substances, the strength of the honeycomb unit is less likely to exhibit dependency on the direction of stress. Thus, according to the embodiment of the present invention, it is possible to provide the honeycomb structure having relatively good strength even in the direction substantially perpendicular to the longitudinal direction compared with a conventional honeycomb structure. Moreover, the honeycomb structure is not easily cracked or damaged during or after its attachment to a metal casing.

The tetrapod-shaped substances shown in FIG. 3B are made of single crystalline bodies, whiskers, etc. Further, the three-dimensional needle-shaped substances shown in FIG. 3C are made of fibers, whiskers, etc. Further, the three-dimensional needle-shaped substances shown in FIG. 3D are made of intergrowth fibers, etc.

Note that FIG. 3D schematically shows an example of the three-dimensional needle-shaped substances, wherein the needle-shaped portions 4a and 4b are connected to one another and may be in any shape such as a substantially cylinder, a substantially circular cone, and a substantially rectangular pillar.

For example, the flake substances are preferably at least one selected from the group consisting of glass flakes, mica, alumina flakes, silica flakes, zinc oxide flakes, etc.

For example, the tetrapod-shaped substances or the three-dimensional needle-shaped substances are preferably at least one selected from the group consisting of alumina, silica, silicon carbide, silica alumina, glass, potassium titanate, aluminum borate, boehmite, zinc oxide, etc.

When the three-dimensional needle-shaped substances are configured to include the fiber bodies composed of plural fibers (see FIG. 3C), the fibers are preferably bonded together by a bonding material (fixing material) formed by melding and solidifying glass, etc. Note that since the fiber bodies are configured to include the plural fibers and the bonding material (fixing material), the expression "material of the fiber bodies" represents the material of the fibers.

Note that the three-dimensional needle-shaped substances may be in any shape so long as they are three-dimensionally shaped.

Further, according to the embodiment of the present invention, the honeycomb units 130 may be configured to include a material containing alumina (e.g., γ-alumina), ceria, silica, zirconia, mullite, etc. In this case, for example, a precious metal catalyst such as platinum is carried on the cell walls 123 of the honeycomb units 130 as a carrier.

Moreover, the honeycomb units 130 may contain SAPO (silicoalumino phosphate). Here, the SAPO is the generic name of the substance obtained by substituting parts of Al (aluminum) and P (phosphoric acid) with $Si^{4+}$. From an academic standpoint, the SAPO is sometimes classified as an analogue of zeolite together with AlPO. However, according to the embodiment of the present invention, these substances are referred to as "zeolite."

Generally, SAPO has the characteristic of increasing a volume along a specific axis when moisture is absorbed. Accordingly, when honeycomb units containing SAPO and inorganic fibers are used as those constituting a conventional honeycomb structure, a change in the volume of the SAPO due to the moisture absorption of the honeycomb units may easily cause local cracks (cleavages) along the orientation direction the inorganic fibers in the honeycomb units.

Conversely, in the honeycomb structure 100 according to the embodiment of the present invention, the flake substances or tetrapod-shaped substances make it possible to suppress or reduce the shrinkage or expansion of the honeycomb units 130 in a specific direction even if the honeycomb units 130 contain SAPO. At the shrinkage or expansion of SAPO, the flake substances serve as obstacles at their surfaces (in the direction of the thickness formed by the length and the width) with respect to the particles of SAPO, and the tetrapod-shaped substances provide the three-dimensionally shaped needle-shaped portions or the fiber portions. Therefore, it is possible to suppress the shrinkage or expansion of the whole honeycomb units. Thus, the honeycomb structure 100 according to the embodiment of the present invention makes it possible to suppress the occurrence of cracks (cleavages) of the honeycomb units 130 due to the moisture absorption of SAPO.

The contents of the flake substances, tetrapod-shaped substances, and three-dimensional needle-shaped substances contained in the honeycomb units 130 are preferably in the range of about 1 percent by weight through about 20 percent by weight. When the contents of the flake substances, tetrapod-shaped substances, and three-dimensional needle-shaped substances are more than or equal to about 1 percent by weight, the effect of enhancing the strength of the honeycomb unit 130 is easily obtainable. On the other hand, when the contents of the flake substances, tetrapod-shaped substances, and three-dimensional needle-shaped substances are less than or equal to about 20 percent by weight, the inorganic particles serving as the catalyst are not easily reduced.

(Configuration of Honeycomb Structure 100)

Next, the configuration of the honeycomb structure 100 according to the embodiment of the present invention is more specifically described.

(Honeycomb Units 130)

Hereinafter, a description is specifically made of a case where the honeycomb units 130 are made of a material primarily using zeolite. However, even in a case where the honeycomb units 130 are made of other materials such as γ alumina, it is obvious for those skilled in the art that a part of the following descriptions can be applied.

The honeycomb units 130 contain an inorganic binder in addition to zeolite and at least one of the flake substances, tetrapod-shaped substances, and three-dimensional needle-shaped substances. Further, the honeycomb units 130 may contain inorganic particles other than zeolite. Moreover, the honeycomb units 130 may contain inorganic fibers.

Zeolite contained in the honeycomb units is, e.g., β zeolite, Y zeolite, ferrierite, ZSM5 zeolite, mordenite, faujasite, zeolite A, or zeolite L. Further, zeolite may be AlPO (alumino phosphate) or SAPO (silicoalumino phosphate). Further, zeolite may be one ion-exchanged with Fe, Cu, Ni, Co, Zn, Mn, Ti, Ag, or V. Among these elements, Fe or Cu is particularly preferable.

As the inorganic binder contained in the honeycomb units, at least one selected from the group consisting of alumina sol, silica sol, titania sol, water glass, sepiolite, attapulgite, and boehmite is preferable.

As inorganic particles other than zeolite, alumina, silica, zirconia, titania, ceria, mullite, etc., are preferable. These particles may be used singly or in combination.

The lower limit of the amount of the inorganic particles including zeolite contained in the honeycomb units is preferably about 30 percent by weight, more preferably about 40 percent by weight, and still more preferably about 50 percent by weight. On the other hand, the upper limit of the amount of the inorganic particles including zeolite contained in the honeycomb units is preferably about 90 percent by weight, more preferably about 80 percent by weight, and still more preferably about 75 percent by weight. When the content of the inorganic particles including zeolite is more than or equal to about 30 percent by weight, the amount of zeolite contributing to conversion of exhaust gas does not easily become relatively small. On the other hand, when the content of the inorganic particles including zeolite is less than or equal to about 90 percent by weight, the strength of the honeycomb units is not easily reduced.

Further, when inorganic fibers are added to the honeycomb units, the material of the inorganic fibers is preferably alumina, silica, silicon carbide, silica alumina, glass, potassium titanate, aluminum borate, etc. These materials may be used singly or in combination. Among these materials, alumina is particularly preferable.

The lower limits of the contents of the flake substances, tetrapod-shaped substances, and three-dimensional needle-shaped substances contained in the honeycomb units are preferably about 3 percent by weight, more preferably about 5 percent by weight, and still more preferably about 8 percent by weight. On the other hand, the upper limits of the contents of the flake substances, tetrapod-shaped substances, and three-dimensional needle-shaped substances contained in the honeycomb units are preferably about 50 percent by weight, more preferably about 40 percent by weight, and still more preferably about 30 percent by weight. When the contents of the flake substances, tetrapod-shaped substances, and three-dimensional needle-shaped substances are more than or equal to about 3 percent by weight, the effect of enhancing the strength of the honeycomb units is easily obtainable. On the other hand, when the contents of the flake substances, tetrapod-shaped substances, and three-dimensional needle-shaped substances are less than or equal to about 50 percent by weight, the amount of zeolite contributing to conversion of exhaust gas does not easily become relatively small. When the inorganic fibers are added to the honeycomb units other than the flake substances, tetrapod-shaped substances, and three-dimensional needle-shaped substances, the sum between them is preferably in the range (of about 3 percent by weight through about 50 percent by weight).

The cell density of the honeycomb units 130 is preferably in the range of about 15.5 through about 186 pieces/cm$^2$ (about 100 through about 1200 cpsi), more preferably in the range of about 46.5 through about 170 pieces/cm$^2$ (about 300 through about 1100 cpsi), and still more preferably in the range of about 62 through about 155 pieces/cm$^2$ (about 400 through about 1000 cpsi).

The thickness of the cell walls 123 of the honeycomb units 130 is not particularly limited. However, the lower limit of the thickness of the cell walls 123 of the honeycomb units 130 is preferably about 0.1 mm in terms of strength, and the upper limit thereof is about 0.4 mm in terms of conversion performance.

(Adhesive Layers 150)

The adhesive layers 150 of the honeycomb structure 100 are made of an adhesive layer paste as a raw material. The adhesive layer paste is not particularly limited but can be, e.g., a mixture of inorganic particles and an inorganic binder, a mixture of an inorganic binder and inorganic fibers, a mixture of inorganic particles, an inorganic binder, and inorganic fibers, etc. Further, the adhesive layer paste may be one obtained by adding an organic binder to these mixtures. Moreover, the flake substances, tetrapod-shaped substances, or three-dimensional needle-shaped substances described above may be added to the adhesive layer paste.

The inorganic particles, inorganic binder, inorganic fibers, and flake substances, tetrapod-shaped substances and/or three-dimensional needle-shaped substances constituting the adhesive layer paste can be the same as those constituting the honeycomb units described above. Further, the organic binder is not particularly limited but can be one or more kinds selected from polyvinylalcohol, methylcellulose, ethylcellulose, carboxymethylcellulose, etc. Among them, carboxymethylcellulose is particularly preferable.

The thickness of the adhesive layers is preferably in the range of about 0.3 through about 2 mm. This is because sufficient bonding strength is easily obtainable when the thickness of the adhesive layers is more than or equal to 0.3 mm. Further, when the thickness of the adhesive layers is less than or equal to about 2 mm, a pressure loss of the honeycomb structure does not easily increase. Note that the number of the honeycomb units to be bonded is appropriately selected in accordance with the size of the honeycomb structure.

(Coating Layer 120)

The coating layer 120 of the honeycomb structure 100 is made of a paste containing at least one of inorganic particles, an inorganic binder, inorganic fibers, flake substances, tetrapod-shaped substances, and three-dimensional needle-shaped substances the same as those constituting the honeycomb units described above, as well as containing an organic binder. The material of the coating layer 120 may be the same as or different from that of the adhesive layers 150. The raw material paste of the coating layer 120 and/or the adhesive layers 150 may appropriately contain pore forming agents such as balloons serving as minute hollow spheres having oxide system ceramic as an ingredient, spherical acrylic particles, or graphite. The final thickness of the coating layer is preferably in the range of about 0.1 through about 2.0 mm.

Note that the above descriptions are based on the honeycomb structure configured by bonding the plural honeycomb units 130 together through the adhesive layers 150.

Figure 4:
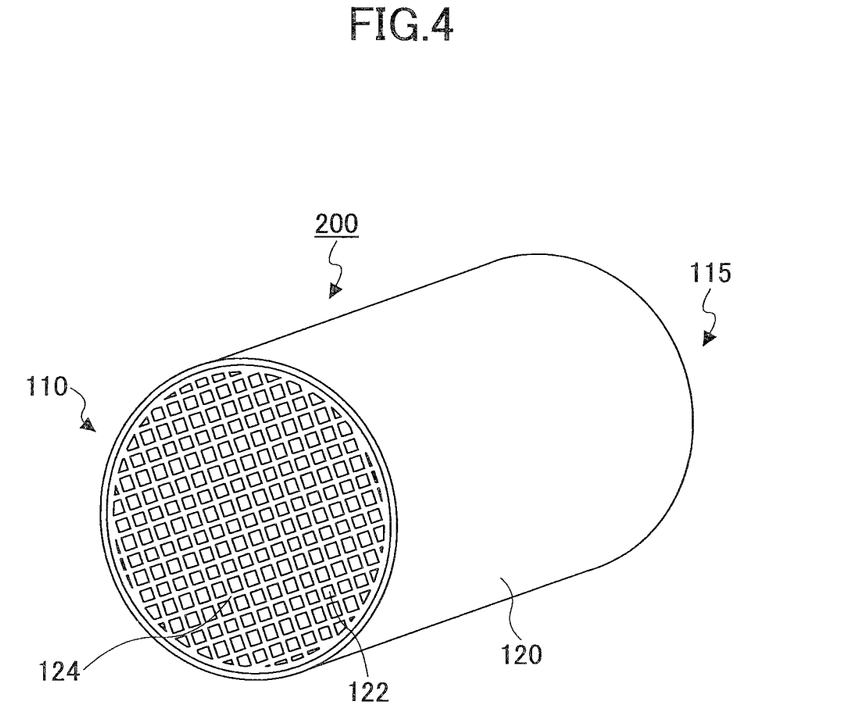
FIG. 4 is a perspective view schematically showing another configuration example of the honeycomb structure according to the embodiment of the present invention.

FIG. 4 shows another configuration example of the honeycomb structure according to the embodiment of the present invention. As shown in FIG. 4, the honeycomb structure 200 has the characteristic of being configured to include a single honeycomb unit in which plural cells 122 are arranged side by side in the longitudinal direction through cell walls 124. Except for such a characteristic, however, the honeycomb structure 200 is the same as the honeycomb structure 100 in its structure. Note that although the coating layer 120 is provided at the peripheral surface of the honeycomb structure 200 in an example shown in FIG. 4, the coating layer 120 may or may not be provided.

(Method for Manufacturing Honeycomb Structure)

Next, a method for manufacturing the honeycomb structures according to the embodiment of the present invention is described. Here, a description is made of an example of manufacturing the honeycomb structure 100 configured to include the plural honeycomb units as shown in FIG. 1. Further, the following description refers to a case in which the honeycomb structure is manufactured by using the honeycomb units 130 primarily using zeolite.

First, extrusion molding, etc., is performed using a raw material paste in which zeolite as inorganic particles, at least one of the flake substances, tetrapod-shaped substances, and three-dimensional needle-shaped substances, and an inorganic binder are used as main ingredients and to which inorganic fibers are appropriately added. As a result, a honeycomb unit molded body is manufactured.

Other than these ingredients, the raw material paste may appropriately contain an organic binder, a dispersion medium, and a molding auxiliary agent so as to suit moldability. The organic binder is not particularly limited but can include one or more kinds selected from methylcellulose, carboxymethylcellulose, hydroxyethylcellulose, polyethylene glycol, phenol resin, epoxy resin, etc. The compounding amount of the organic binder is preferably in the range of about 1 through about 10 parts by weight relative to 100 parts by weight in total of the inorganic particles, inorganic binder, flake substances, tetrapod-shaped substances, and three-dimensional needle-shaped substances (including the inorganic fibers as required).

The dispersion medium is not particularly limited but can include water, an organic solvent (such as benzene), alcohol (such as methanol), etc. The molding auxiliary agent is not particularly limited but can include ethylene glycol, dextrin, fatty acid, fatty acid soap, polyalcohol, etc.

The raw material paste is, although not particularly limited, preferably mixed and kneaded. For example, the raw material paste may be mixed by a mixer, an attoritor, etc., and may be sufficiently kneaded by a kneader, etc. A method for molding the raw material paste is not particularly limited. However, it is preferable to use extrusion molding, etc., to mold the raw material paste into a shape having cells.

Next, the molded body thus obtained is preferably dried. A drying apparatus used for drying the molded body is not particularly limited but can include a microwave drying apparatus, a hot-air drying apparatus, a dielectric drying apparatus, a pressure-reduction drying apparatus, a vacuum drying apparatus, a freeze drying apparatus, etc. Further, the obtained molded body is preferably degreased. Degreasing conditions are not particularly limited and are appropriately selected according to the kind and amount of organic matter contained in the molded body. However, the molded body is preferably degreased for about two hours at about 400° C. Moreover, the obtained molded body thus degreased is preferably fired. Firing conditions are not particularly limited, but a firing temperature is preferably in the range of about 600 through about 1200° C. and more preferably in the range of about 600 through about 1000° C. This is because when the firing temperature is more than or equal to about 600° C., the sintering of the molded body easily progresses and the strength of the honeycomb units is reduced. On the other hand, when the firing temperature is less than or equal to about 1200° C., the sintering of the molded body does not easily excessively progress and thus the ratio of converting exhaust gas is not easily reduced.

Next, the side surfaces of the honeycomb unit are evenly coated with an adhesive layer paste which serves as adhesive layers. Thus, other honeycomb units are successively bonded together through the adhesive layer paste. The above steps are repeatedly carried out so as to manufacture a honeycomb structure in a desired size (e.g., the honeycomb structure in which the honeycomb units are arranged in four rows in vertical and horizontal directions).

Next, the honeycomb structure is heated so that the adhesive layer paste is dried and solidified. Thus, the adhesive layers are formed to bond the honeycomb units together.

Then, the honeycomb structure is cut into a cylindrical shape by a diamond cutter, etc., so as to have a required peripheral shape.

Next, a coating layer paste is coated on the peripheral surface (side surface) of the honeycomb structure and then dried and solidified. Thus, a coating layer is formed on the peripheral surface.

The honeycomb structure is preferably degreased after the plural honeycomb units are bonded together through the adhesive layers (or after the coating layer is formed on the peripheral surface). With this process, the organic binder contained in the adhesive layer paste and the coating layer paste can be degreased and removed. Degreasing conditions can be appropriately selected according to the kind and amount of contained organic matter. However, the honeycomb structure is preferably degreased for about two hours at about 700° C.

With the above steps, the honeycomb structure shown in FIG. 1 can be manufactured.

EXAMPLES

Hereinafter, the embodiment of the present invention is specifically described based on the following examples.

Example 1

First, 41 percent by weight of SAPO particles (having an average particle diameter of 2 μm), 64 percent by weight of the flake substances, 11.8 percent by weight of an inorganic binder (boehmite), 5.0 percent by weight of an organic binder (methylcellulose), 3.7 percent by weight of a lubricant agent (oleic acid), and 32.1 percent by weight of ion-exchange water were mixed and kneaded to obtain a mixed composition. Note that glass flakes (aluminoborosilicate glass) were used as the flake substances. The glass flakes had an average particle diameter of 15 μm, an average thickness of 5 μm, and an aspect ratio (average particle diameter/average thickness) of 3.

Next, the mixed composition was extrusion-molded by an extrusion molding apparatus to obtain a rectangular-pillar-shaped honeycomb unit molded body as shown in FIG. 2.

Then, the molded body was sufficiently dried by a microwave drying apparatus and a hot-air drying apparatus, followed by being degreased for two hours at 400° C. After that, the degreased molded body was fired for two hours at 700° C. to obtain a honeycomb unit (34.3 mm in length×34.3 mm in width×100 mm in total length). The thickness of the cell walls 123 of the honeycomb unit was 0.2 mm. The cell density was 124 pieces/cm$^2$.

Example 2

The honeycomb unit according to Example 2 was manufactured by the same process as that of Example 1. In Example 2, however, aluminoborosilicate glass having an average particle diameter of 160 μm, an average thickness of 5 μm, and an aspect ratio (average particle diameter/average thickness) of 32 was used as the glass flakes. Other manufacturing conditions are the same as those of Example 1.

Example 3

The honeycomb unit according to Example 3 was manufactured by the same process as that of Example 1. In Example 3, however, white mica was used as the flake substances. The white mica had an average particle diameter of 23 μm, an average thickness of 0.3 μm, and an aspect ratio (average particle diameter/average thickness) of 77. Other manufacturing conditions are the same as those of Example 1.

Example 4

The honeycomb unit according to Example 4 was manufactured by the same process as that of Example 3. In Example 4, however, white mica having an average particle diameter of 47 μm, an average thickness of 0.6 μm, and an aspect ratio (average particle diameter/average thickness) of 78 was used. Other manufacturing conditions are the same as those of Example 1.

Example 5

The honeycomb unit according to Example 5 was manufactured by the same process as that of Example 1. In Example 5, however, α alumina flakes were used as the flake substances. The α alumina flakes had an average particle diameter of 10 μm, an average thickness of 0.3 μm, and an aspect ratio (average particle diameter/average thickness) of 33. Other manufacturing conditions are the same as those of Example 1.

Example 6

The honeycomb unit according to Example 6 was manufactured by the same process as that of Example 1. In Example 6, however, zinc oxide (single crystalline needle-shaped substances) was used as the tetrapod-shaped substances instead of the flake substances. The zinc oxide had an average fiber length (corresponding to the needle-shaped portion 2a in FIG. 3B) of 20 μm. Other manufacturing conditions are the same as those of Example 1.

Example 7

The honeycomb unit according to Example 7 was manufactured by the same process as that of Example 1. In Example 7, however, alumina fiber bodies (in which plural alumina fibers are bonded together by glass) were used as the three-dimensional needle-shaped substances instead of the flake substances. The alumina fiber bodies had an average fiber length (corresponding to the fiber portion 3a in FIG. 3C) of 50 μm and an average fiber diameter of 6 μm. Other manufacturing conditions are the same as those of Example 1.

Example 8

The honeycomb unit according to Example 8 was manufactured by the same process as that of Example 1. In Example 8, however, γ alumina particles (having an average particle diameter of 2 μm) were used instead of SAPO particles. Other manufacturing conditions are the same as those of Example 1.

Example 9

The honeycomb unit according to Example 9 was manufactured by the same process as that of Example 1. In Example 9, however, 36.9 percent by weight of SAPO particles (having a particle diameter of 2 μm), 12.4 percent by weight of the flake substances, 11.4 percent by weight of an inorganic binder (boehmite), 4.8 percent by weight of an organic binder (methylcellulose), 3.6 percent by weight of a lubricant agent (oleic acid), and 30.9 percent by weight of ion-exchanged water were mixed and kneaded to obtain a mixed composition. Note that glass flakes (aluminoborosilicate glass) were used as the flake substances. The glass flakes had an average particle diameter of 15 μm, an average thickness of 5 μm, and an aspect ratio (average particle diameter/average thickness) of 3. Other manufacturing conditions are the same as those of Example 1.

Example 10

The honeycomb unit according to Example 10 was manufactured by the same process as that of Example 9. In Example 10, however, white mica was used as the flake substances. The white mica had an average particle diameter of 23 μm, an average thickness of 0.3 μm, and an aspect ratio (average particle diameter/average thickness) of 77. Other manufacturing conditions are the same as those of Example 9.

Example 11

The honeycomb unit according to Example 11 was manufactured by the same process as that of Example 1. In Example 11, however, boehmite intergrowth particles shown in FIG. 3D were used as the three-dimensional needle-shaped substances instead of the flake substance. The average particle diameter of the boehmite particles was 20 μm, the thickness q of the needle-shaped portion 4a was 0.2 μm, and the aspect ratio (average particle diameter/average thickness) of the needle-shaped portion 4b was 25. Other manufacturing conditions are the same as those of Example 1.

Comparative Example 1

The honeycomb unit according to Comparative Example 1 was manufactured by the same process as that of Example 1. In Comparative Example 1, however, alumina fibers were used instead of the flake substances. The alumina fibers had an average fiber length of 120 μm and an average fiber diameter of 6 μm. Other manufacturing conditions are the same as those of Example 1.

Comparative Example 2

The honeycomb unit according to Comparative Example 2 was manufactured by the same process as that of Comparative Example 1. In Comparative Example 2, however, glass fibers were used instead of alumina fibers. The glass fibers had an average fiber length of 85 μm and an average fiber diameter of 6 μm. Other manufacturing conditions are the same as those of Comparative Example 1.

Comparative Example 3

The honeycomb unit according to Comparative Example 3 was manufactured by the same process as that of Comparative Example 1. In Comparative Example 3, however, γ alumina particles (having an average particle diameter of 2 μm) were used instead of SAPO particles. Other manufacturing conditions are the same as those of Comparative Example 1.

Table 1 shows the main ingredients of the honeycomb units according to the respective Examples; the material of the flake substances, tetrapod-shaped substances, or three-dimensional needle-shaped substances used in the honeycomb units; the contents of the flake substances, tetrapod-shaped substances, or three-dimensional needle-shaped substances; the average particle diameter of the flake substances, the average thickness of the flake substances, the aspect ratio of the flake substances, and the average needle-shaped length (average fiber length) of the tetrapod-shaped substances; the average fiber diameter of the three-dimensional needle-shaped substances, the average particle diameter of the three-dimensional needle-shaped substances, the average thickness of the needle-shaped portions of the three-dimensional needle-shaped substances, and the aspect ratio of the needle-shaped portions of the three-dimensional needle-shaped substances. Table 1 also shows the main ingredients of the honeycomb units according to the respective Comparative Examples, the material of the inorganic fibers, the average fiber length of the inorganic fibers, and the average fiber diameter of the inorganic fibers used in the honeycomb units.

TABLE 1

FLAKE SUBSTANCE, TETRAPOD-SHAPED SUBSTANCE, THREE-DIMENSIONAL NEEDLE-SHAPED SUBSTANCE, OR INORGANIC FIBER

| | MAIN INGREDIENT | MATERIAL | CONTENT OF FLAKE SUBSTANCES (wt %) | AVERAGE PARTICLE DIAMETER OR AVERAGE FIBER LENGTH (μm) | AVERAGE THICKNESS OR AVERAGE FIBER DIAMETER (μm) | ASPECT RATIO | BENDING STRENGTH (MPa) | RESULTS OF MOISTURE ABSORPTION TEST |
|---|---|---|---|---|---|---|---|---|
| EXAMPLE 1 | SAPO | GLASS FLAKE | 6.4 | 15 | 5 | 3 | 1.2 | GOOD |
| EXAMPLE 2 | SAPO | GLASS FLAKE | 6.4 | 160 | 5 | 32 | 1.1 | GOOD |
| EXAMPLE 3 | SAPO | WHITE MICA | 6.4 | 23 | 0.3 | 77 | 1.1 | GOOD |
| EXAMPLE 4 | SAPO | WHITE MICA | 6.4 | 47 | 0.6 | 78 | 1.1 | GOOD |
| EXAMPLE 5 | SAPO | ALUMINA FLAKE | 6.4 | 10 | 0.3 | 33 | 1.1 | GOOD |
| EXAMPLE 6 | SAPO | ZINC OXIDE NEEDLE-SHAPED SUBSTANCE | 6.4 | 20✕ | — | — | 1.2 | GOOD |
| EXAMPLE 7 | SAPO | ALUMINA FIBER BODY | 6.4 | 50✕ | 6 | — | 1.0 | GOOD |
| EXAMPLE 8 | γ ALUMINA | GLASS FLAKE | 6.4 | 15 | 5 | 3 | 1.6 | — |
| EXAMPLE 9 | SAPO | GLASS FLAKE | 12.4 | 15 | 5 | 3 | 1.4 | GOOD |
| EXAMPLE 10 | SAPO | WHITE MICA | 12.4 | 23 | 0.3 | 77 | 1.3 | GOOD |
| EXAMPLE 11 | SAPO | BOEHMITE INTERGROWTH PARTICLE | 6.4 | 20 | 0.2 | 25 | 1.6 | GOOD |
| COMPARATIVE EXAMPLE 1 | SAPO | ALUMINA FIBER | — | 120 | 6 | — | 0.7 | CRACK OCCURS |
| COMPARATIVE EXAMPLE 2 | SAPO | GLASS FIBER | — | 85 | 6 | — | 0.7 | CRACK OCCURS |
| COMPARATIVE EXAMPLE 3 | γ ALUMINA | ALUMINA FIBER | — | 120 | 6 | — | 1.3 | — |

✕AVERAGE NEEDLE LENGTH (μm) OF NEEDLE-SHAPED PORTION OR AVERAGE FIBER LENGTH (μm) OF FIBER PORTION (Four-Point Bending Test)

A four-point bending test was performed using the honeycomb units manufactured according to the above-described methods (respective Examples and respective Comparative Examples) to evaluate the strength of the honeycomb units. The four-point bending test was performed according to a method based on JISR1601 (method for testing the room temperature bending strength of fine ceramics). More specifically, assuming that a distance between loaded points on an upper surface is 20 mm and a distance between supporting points on a lower surface is 85 mm, a load is applied to the honeycomb units to measure their breaking strengths. An Instron 5582 was used as a load applying apparatus, and a load variation speed was 10 mm per minute. The test was performed 10 times for each of the honeycomb units. Details about JISR1601 are incorporated herein.

The test results of the bending strength (MPa) measured by the four-point bending test are shown in table 1. The four-point bending strength of the honeycomb units according to Examples 1 through 7 and 11, in which SAPO is used as a main ingredient and to which the flake substances, tetrapod-shaped substances, or three-dimensional needle-shaped substances are added, was in the range of 1.0 through 1.2 MPa. On the other hand, the four-point bending strength of the honeycomb units according to Comparative Examples 1 and 2, to which the flake substances, tetrapod-shaped substances, and three-dimensional needle-shaped substances were not added, was 0.7 MPa.

Further, the four-point bending strength of the honeycomb unit according to Example 8, in which λ alumina was used as a main ingredient and to which the flake substances were added, was 1.6 MPa. On the other hand, the four-point bending strength of the honeycomb unit according to Comparative Example 3, to which the flake substances, tetrapod-shaped substances, and three-dimensional needle-shaped substances were not added, was 1.3 MPa.

It is clear from these results that the strength of the honeycomb units was improved by the addition of the flake substances, tetrapod-shaped substances, or three-dimensional needle-shaped substances regardless of the kinds of the main ingredients.

Further, the four-point bending strengths of the honeycomb units according to Examples 9 and 10, in which SAPO was used as a main ingredient and the content of the flake substances was further increased, were 1.3 MPa and 1.4 MPa, respectively. It is clear from this that the strengths of the honeycomb units were improved along with the content of the flake substances. It is expected that the same results would be obtained even where the content of the tetrapod-shaped substances or three-dimensional needle-shaped substances is changed.

(Moisture Absorption Test)

Next, a moisture absorption test was performed by the following method using the honeycomb units according to Examples 1 through 7 and 9 through 11, and Comparative Examples 1 and 2.

First, heat-resisting adhesive layer paste and coating layer paste were prepared by mixing and kneading 767 g of alumina fibers having an average fiber diameter of 0.5 μm and an average fiber length of 15 μm, 2500 g of silica glass, 17 g of carboxymethylcellulose, 600 g of silica sol having a solid content of 30 percent by weight, 167 g of polyvinyl alcohol, 167 g of a surfactant, and 17 g of alumina balloons.

The honeycomb units manufactured by the same method as those of Examples and Comparative Examples are bonded together by an adhesive layer paste in four rows in vertical and horizontal directions. Next, the aggregation of the honeycomb units is heated to 120° C., the adhesive layer paste is dried and solidified to form the adhesive layers, and the honeycomb units are bonded together. Then, the aggregation of the honeycomb units is cut into, e.g., a cylinder by a diamond cutter, and a coating layer paste is coated on the peripheral surface (side surface) of the aggregation. After that, the aggregation of the honeycomb units is heated to 120° C. and the coating layer paste is dried and solidified to form a coating layer. Thus, a cylindrical honeycomb structural body having a diameter of 143.8 mm×a total length of 100 mm is manufactured.

With the process described above, the honeycomb structure as shown in FIG. 1 is manufactured.

Next, a mat material (having a thickness of 10 mm) made of inorganic fibers is wound around and fixed to the peripheral surface of the honeycomb structure. Then, the honeycomb structure is attached into a metal casing having an inner diameter of 160 mmϕ. In this state, the honeycomb structure is held in a room (having a temperature of 25° C. and a humidity of 55%) for two hours (the honeycomb units absorb water in air). After that, the honeycomb structure is removed from the metal casing, and the condition of the honeycomb structure was visually checked.

The test results are shown at a right end in table 1. When the honeycomb structure is configured to include the honeycomb units according to Examples 1 through 7, and 9 through 11 in which SAPO is used as a main ingredient and to which the flake substances, tetrapod-shaped substances, or three-dimensional needle-shaped substances are added, no abnormality (breakage, crack) was found in the honeycomb structure after the moisture absorption test. Conversely, when the honeycomb structure is configured to include the honeycomb units according to Comparative Examples 1 and 2 to which the flake substances, tetrapod-shaped substances, or three-dimensional needle-shaped substances are not added (inorganic fibers are added), cracks occurred at the end faces of the honeycomb units after the moisture absorption test.

Thus, it is clear from the above that the occurrence of breakage, cracks, etc., can be prevented by the addition of at least one of the flake substances, tetrapod-shaped substances, and three-dimensional needle-shaped substances to the honeycomb units.

The present invention is not limited to the specifically disclosed embodiment, and variations and modifications may be made without departing from the scope of the present invention.

What is claimed is:

1. A honeycomb structure comprising:
   a honeycomb unit comprising:
      plural cells extending from a first end face to a second end face of the honeycomb structure along a longitudinal direction of the honeycomb structure, the plural cells being defined by cell walls;
      inorganic particles; and
      at least one of a flake substance comprising zinc oxide flake or aluminosilicate glass flake, and a tetrapod-shaped substance comprising zinc oxide.

2. The honeycomb structure according to claim 1, wherein the flake substance has an aspect ratio in a range of about 3 through about 250.

3. The honeycomb structure according to claim 1, wherein the inorganic particles comprise zeolite.

4. The honeycomb structure according to claim 3, wherein the zeolite comprises at least one of β zeolite, Y zeolite, ferrierite, ZSM5 zeolite, mordenite, faujasite, zeolite A, and zeolite L.

5. The honeycomb structure according to claim 3, wherein the zeolite comprises at least one of AlPO (alumino phosphate) and SAPO (silicoalumino phosphate).

6. The honeycomb structure according to claim 3, wherein the zeolite is ion-exchanged with Fe or Cu.

7. The honeycomb structure according to claim 3, wherein the flake substance is provided with widths having unregulated orientations in a direction perpendicular to the longitudinal direction, and wherein the tetrapod-shaped substance has fiber portions or needle-shaped portions having unregulated orientations.

8. The honeycomb structure according to claim 5, wherein the flake substance is provided with widths having unregulated orientations in a direction perpendicular to the longitudinal direction, and wherein the tetrapod-shaped substance has fiber portions or needle-shaped portions having unregulated orientations.

9. The honeycomb structure according to claim 1, wherein the inorganic particles comprise at least one of alumina, silica, ceria, zirconia, and mullite.

10. The honeycomb structure according to claim 1, further comprising an inorganic binder that comprises at least one of alumina sol, silica sol, titania sol, water glass, sepiolite, attapulgite, and boehmite.

11. The honeycomb structure according to claim 1, wherein the honeycomb unit comprises plural honeycomb units bonded together through an adhesive layer.

12. The honeycomb structure according to claim 1, further comprising a coating layer provided at a peripheral surface of the honeycomb structure other than the first and second end faces of the honeycomb structure.

13. The honeycomb structure according to claim 1, wherein the honeycomb structure is so constructed as to be used as a catalyst carrier to convert CO, HC, and/or NOx.

14. The honeycomb structure according to claim 1, wherein the honeycomb structure is so constructed as to be used in an SCR system.

15. The honeycomb structure according to claim 1, wherein the flake substance has a thickness in a range of about 0.2 μm through about 5 μm, a maximum length in a range of about 10 μm through about 160 μm, and an aspect ratio (maximum length/thickness) in a range of about 3 through about 250.

16. The honeycomb structure according to claim 1, wherein the tetrapod-shaped substance comprises a needle-shaped portion that has an average length in a range of about 5 μm through about 30 μm and that has an average diameter in a range of about 0.5 μm through about 5 μm.

17. The honeycomb structure according to claim 1, wherein the tetrapod-shaped substance comprises single crystalline bodies or whiskers.

18. The honeycomb structure according to claim 1, wherein a precious metal catalyst is carried on the three-dimensional needle-shaped substance.

19. The honeycomb structure according to claim 3, wherein zeolite is ion-exchanged with Fe, Cu, Ni, Co, Zn, Mn, Ti, Ag, or V.

20. The honeycomb structure according to claim 1, wherein the inorganic particles contained in the honeycomb unit comprise zeolite, and a lower limit of an amount of the inorganic particles is about 30 percent by weight, and an upper limit of the amount of the inorganic particles is about 90 percent by weight.

21. The honeycomb unit according to claim 1, wherein a lower limit of a content of the at least one of the flake substance, and the tetrapod-shaped substance contained in the honeycomb unit is about 3 percent by weight, and an upper limit of the content of the at least one of the flake substance, and the tetrapod-shaped substance is about 50 percent by weight.

22. The honeycomb structure according to claim 1, wherein a cell density of the honeycomb unit is in a range of about 15.5 pieces/cm$^2$ through about 186 pieces/cm$^2$.

23. The honeycomb structure according to claim 1, wherein a lower limit of a thickness of the honeycomb unit is about 0.1 mm, and an upper limit of the thickness of the honeycomb unit is about 0.4 mm.

24. The honeycomb structure according to claim 1, wherein the honeycomb structure comprises a single honeycomb unit.

25. The honeycomb structure according to claim 1, wherein the honeycomb unit comprises aluminoborosilicate glass flake.

26. The honeycomb structure according to claim 1, wherein the flake substance is provided with widths having unregulated orientations in a direction perpendicular to the longitudinal direction, and wherein the tetrapod-shaped substance has fiber portions or needle-shaped portions having unregulated orientations.

* * * * *